(12) United States Patent
Galou et al.

(10) Patent No.: US 6,957,263 B2
(45) Date of Patent: Oct. 18, 2005

(54) CONNECTION MANAGEMENT SYSTEM AND GRAPHICAL USER INTERFACE FOR LARGE-SCALE OPTICAL NETWORKS

(75) Inventors: Salim Galou, San Jose, CA (US); Gilbert Levesque, Mountain View, CA (US); Francois Lafontaine, Richardson, TX (US); Yalin Wang, San Jose, CA (US); Kevin Zhu, San Jose, CA (US); Vinay Muniganti, Sunnyvale, CA (US)

(73) Assignee: Fujitsu Limited, Kawasaki (JP)

( * ) Notice: Subject to any disclaimer, the term of this patent is extended or adjusted under 35 U.S.C. 154(b) by 21 days.

(21) Appl. No.: 10/300,096

(22) Filed: Nov. 19, 2002

(65) Prior Publication Data

US 2004/0098474 A1 May 20, 2004

(51) Int. Cl.[7] .................. G06F 15/16; G06F 15/173
(52) U.S. Cl. .................. 709/227; 709/228; 709/223; 709/219
(58) Field of Search ................. 709/217–220, 709/222–225, 227–228, 244, 230

(56) References Cited

U.S. PATENT DOCUMENTS

| | | | |
|---|---|---|---|
| 5,375,199 A | 12/1994 | Harrow et al. | 345/771 |
| 5,726,979 A | 3/1998 | Henderson et al. | 700/29 |
| 5,845,062 A | 12/1998 | Branton, Jr. et al. | 714/25 |
| 5,870,558 A | 2/1999 | Branton, Jr. et al. | 709/224 |
| 5,887,139 A | 3/1999 | Madison, Jr. et al. | 709/223 |
| 5,926,180 A | 7/1999 | Shimamura | 345/739 |
| 5,966,509 A | 10/1999 | Abe et al. | 714/4 |
| 6,009,466 A | 12/1999 | Axberg et al. | 709/220 |
| 6,052,722 A | 4/2000 | Taghadoss | 709/223 |
| 6,058,103 A | 5/2000 | Henderson | 370/254 |
| 6,061,332 A | 5/2000 | Branton, Jr. et al. | 370/241 |
| 6,064,671 A * | 5/2000 | Killian | 370/389 |
| 6,098,028 A | 8/2000 | Zwan et al. | 702/120 |
| 6,112,015 A | 8/2000 | Planas et al. | 709/223 |
| 6,115,743 A | 9/2000 | Cowan et al. | 709/224 |

(Continued)

*Primary Examiner*—Ario Etienne
*Assistant Examiner*—Hussein Chanti
(74) *Attorney, Agent, or Firm*—Dergosits & Noah LLP

(57) ABSTRACT

A network management system program and graphical user interface for large-scale optical networks is described. The network management system includes a connection management system that allows a user to manually configure connections among network elements within the network. The user defines general connection attributes within the network and adds network elements to the route or routes. The user provisions crossconnects within each network element to establish the route connections. The connection management system includes a validation function to verify the validity of the user defined connections. A graphical user interface comprises a portion of a network management system that controls a network comprising a plurality of coupled computers. The graphical user interface includes a first user input area within a first display window allowing a user to specify a network address for a source node, a second user input area within the first display window allowing the user to specify a network address for a destination node, and a third user input area within a second display window allowing the user to graphically select a connection between the source node and one or more destination nodes in the network. The network management system program includes a first database storing the selected connection as a pending connection, a second database storing the selected connection as an active connection upon activation by the user, and a program module establishing a physical connection between the source and destination nodes upon activation by the user.

5 Claims, 16 Drawing Sheets

U.S. PATENT DOCUMENTS

| | | | |
|---|---|---|---|
| 6,128,016 A | 10/2000 | Coelho | 345/808 |
| 6,133,919 A | 10/2000 | Bormann et al. | 345/839 |
| 6,138,150 A * | 10/2000 | Nichols et al. | 709/219 |
| 6,160,552 A | 12/2000 | Wilsher et al. | 345/739 |
| 6,205,483 B1 | 3/2001 | Nakanishi | 709/229 |
| 6,212,674 B1 | 4/2001 | Suckow | 717/109 |
| 6,225,999 B1 * | 5/2001 | Jain et al. | 345/734 |
| 6,247,052 B1 * | 6/2001 | Huang et al. | 709/224 |
| 6,259,679 B1 | 7/2001 | Henderson et al. | 370/254 |
| 6,269,398 B1 | 7/2001 | Leong et al. | 709/224 |
| 6,285,688 B1 | 9/2001 | Henderson et al. | 370/516 |
| 6,289,380 B1 | 9/2001 | Battat et al. | 709/224 |
| 6,308,281 B1 * | 10/2001 | Hall et al. | 714/4 |
| 6,314,093 B1 * | 11/2001 | Mann et al. | 370/351 |
| 6,446,058 B1 * | 9/2002 | Brown | 706/60 |
| 6,567,410 B1 * | 5/2003 | Perlman | 370/401 |
| 6,665,714 B1 * | 12/2003 | Blumenau et al. | 709/222 |
| 6,779,083 B2 * | 8/2004 | Ito et al. | 711/114 |
| 6,801,910 B1 * | 10/2004 | Bedell et al. | 707/6 |
| 6,850,253 B1 * | 2/2005 | Bazerman et al. | 715/734 |

* cited by examiner

FIG. 5

| | TO | SOURCE AID | DESTINATION AID | RATE | TYPE | SERVICE SELECTOR | REDLINE | STATUS | OPERATION RESULT |
|---|---|---|---|---|---|---|---|---|---|
| 1 | SIMFLN:501984 | 1-3-2-1 | 3-1-2 | VT1 | 1WAY | | ☐ | ACTIVE | SUCCESSFUL |
| 2 | SIMFLN:501984 | 3-1-2 | 1-3-2-1 | VT1 | 1WAY | | ☐ | PENDING | SUCCESSFUL |

CONNECTION MANAGEMENT

FILE  EDIT  VIEW  OPERATIONS
[NEW] [SEARCH] [RELOAD] [SAVE] [DELETE] [ACTIVATE] [DEACTIVATE] [DETACH] [VALIDATE] [AUDIT] [DISCOVERY]

CONNECTION DETAILS

NAME: CONN_10
DIMENSIONS: 1WAY
STATUS: ACTIVE
RATE: VT1

| CONNECTION ATTRIBUTE NAME | CONNECTION ATTRIBUTE VALUE |
|---|---|
| DESCRIPTION | |
| CONTACT PHONE NUMBER | |
| CONTACT ADDRESS | |
| OWNER | |

NE AND AIDS FOR CROSSCONNECT
[ADD NE] [LAUNCH XC MANAGER] [UPDATE XC MANAGER] [SET CONN SOURCE] [UNSET CONN DEST] [GET NEXT NE]

CONNECTION SOURCE INFO

| TO | SOURCE AID |
|---|---|
| SIMFLN:501984 | 1-3-2-1 |

CONNECTION DESTINATION INFO

| TO | DESTINATION AID |
|---|---|
| SIMFLN:501984 | 1-3-2-1 |

[DETAILS] [REPORTS]

CROSSCONNECT REPORT

FILE  EDIT  VIEW  OPERATIONS

[GENERATE] [PREVIOUS] [NEXT] [PRINT] [FILTER] [SORT] [COLUMNS] [DESELECT] [HELP]

| | FROM | TO | RATE | REDLINE | CROSSCONNECT NAME | CROSSCONNECT TYPE |
|---|---|---|---|---|---|---|
| 1 | V1-1-3-1 | V1-1-2-4 | VT1 | NO | | 2WAY |
| 2 | V1-1-2-1 | V1-1-2-1 | VT1 | YES | | 1WAY |
| 3 | V1-1-2-2 | V1-1-2-2 | VT1 | NO | | 1WAY |
| 4 | V1-1-2-4 | V1-1-3-1 | VT1 | NO | | 2WAY |
| 5 | V1-1-1-1 | V1-1-1-2 | VT1 | YES | | 2WAY |
| 6 | V1-1-1-2 | V1-1-1-1 | VT1 | YES | | 2WAY |
| 7 | X1-1 | 15-1 | STS12C | NO | | 2WAY |
| 8 | 15-1 | X1-1 | STS12C | NO | | 2WAY |
| 9 | 8-2 | X1-22 | STS1 | NO | | 2WAY |
| 10 | 8-3 | 13-3 | STS1 | YES | | 2WAY |
| 11 | X1-47 | 10-1 | STS1 | NO | | 2WAY |
| 12 | X1-48 | 10-3 | STS1 | NO | | 2WAY |
| 13 | 10-1 | X1-47 | STS1 | NO | | 2WAY |
| 14 | 10-3 | X1-48 | STS1 | NO | | 2WAY |
| 15 | 13-2 | 12-2 | STS1 | NO | | 2WAY |
| 16 | 13-3 | 8-3 | STS1 | YES | | 2WAY |
| 17 | 12-1 | V1-1 | STS1 | NO | | 2WAY |
| 18 | 12-2 | 13-2 | STS1 | NO | | 2WAY |

[CLOSE] [HELP]

AUDIT CONNECTION

◉ UPDATE DATABASE
○ UPDATE NETWORK ELEMENT

| CROSSCONNECT | TO | NE XC STATUS | DATABASE XC STATUS | NEW XC STATUS | AUDIT TIME |
|---|---|---|---|---|---|
| A3 1-3-1-4 TO AD 2-3-1-4 RATE VT1 | XMFLN15D1492 | FAILED | ACTIVE | PENDING | TUE 31 APR 09:43:31 PST |
| A3 1-3-2-1 TO AD 2-3-2-1 RATE VT1 | XMFLN15D1492 | MATCHED | PENDING | PENDING | TUE 31 APR 09:43:31 PST |

[AUDIT] [RECONCILE] [CLOSE]

FIG. 15

CONNECTION MANAGEMENT SYSTEM AND GRAPHICAL USER INTERFACE FOR LARGE-SCALE OPTICAL NETWORKS

FIELD OF THE INVENTION

The present invention relates generally to network management systems, and more specifically to a graphical user interface system for implementing and controlling various network connectivity and display functions.

BACKGROUND OF THE INVENTION

Large-scale distributed networks are managed by extensive network management system (NMS) programs that coordinate and manage the various interface protocols for the network elements and links that comprise the network. Modern large-scale wide area networks (WANs) or metropolitan scale networks (MANs) can consist of thousands of network elements spread over hundreds or thousands of miles. These network elements, or nodes, are coupled together through a vast number of network links. Large-scale terrestrial networks typically utilize fiber optic telecommunications systems to implement the physical network infrastructure. A primary standard for network interconnectivity over these networks is the Synchronous Optical Network (SONET) standard. The SONET standard comprehensively defines the addressing, data packaging, timing, protocol interfaces, and other parameters related to the functional operation of the network system. To manage such large scale networks, sophisticated network management systems are required. Such network management system programs typically need to perform various diverse tasks, such as configuration management, performance management, fault management, security management, wavelength management, connection management, and network node profile management, as well as various other tasks.

Effective management of large-scale networks using complex network management system programs requires sophisticated graphical user interfaces so that personnel at the network operations center can efficiently design, manage, monitor, and modify the network. Furthermore, with the increasing complexity of wide area networks that span large amounts of area, effective connectivity and routing is necessary to ensure transmission efficiency and maintain bandwidth limitations. Present network management systems provide some level of connection management that aids in the design of links among various nodes. However, typical connectivity programs are scaled for relatively small-scale networks, and are not proven for large-scale networks featuring thousands of nodes. Furthermore, typical conventional network management systems do not provide flexible connection schemes that allow the design and modification of network paths for optimized design by network designers. These systems also do not usually provide intuitive graphical user interfaces that allow the display of hierarchical views of the network down to the shelf and card level.

What is needed, therefore, is a network management system that can establish SONET end-to-end paths through a complex network, and a system that allows for automated or semi-automated (partially manual) routing of end-to-end routes. What is further needed is a network management system that can evolve to manage SDH and DWDM networks, and that scales with large numbers of networks (e.g., networks with up to 8000 nodes and 50 active users.

SUMMARY OF THE INVENTION

A network management system and graphical user interface for displaying and modifying a network configuration is described. The graphical user interface comprises a portion of a network management system that controls a network comprising a plurality of coupled computers. The graphical user interface includes a first user input area within a first display window allowing a user to specify a network address for a source node, a second user input area within the first display window allowing the user to specify a network address for a destination node, and a third user input area within a second display window allowing the user to graphically select a connection between the source node and one or more destination nodes in the network. The network management system program includes a first database storing the selected connection as a pending connection, a second database storing the selected connection as an active connection upon activation by the user, and a program module establishing a physical connection between the source and destination nodes upon activation by the user.

The network management system includes a connection management system that allows a user to manually configure connections among network elements within the network. The user defines general connection attributes within the network and adds network elements to the route or routes. The user provisions crossconnects within each network element to establish the route connections. The connection management system includes a validation function to verify the validity of the user defined connections. Through the graphical user interface, various dialogs are provided to allow the user to execute various connection management system modules such as auditing a connection, reconciling a connection, modify routes and crossconnects, configuring alarm conditions, and other similar functions.

A synchronized scrolling function allows the characteristics for corresponding channels to be displayed coincidentally within the first and second display areas when the total number of available channels exceeds a maximum number that can be displayed in a single display area.

Other features and advantages of the present invention will be apparent from the accompanying drawings and from detailed description that follows.

BRIEF DESCRIPTION OF THE DRAWINGS

The present invention is illustrated by way of example and not limitation in the figures of the accompanying drawings, in which like references indicate similar elements, and in which:

FIG. 5 illustrates the connection management display screen for a graphical user interface utilized by the network management system program, according to one embodiment of the present invention;

FIG. 10 illustrates a crossconnect report display screen, according to one embodiment of the present invention;

FIG. 13 illustrates the connection details report display screen, according to one embodiment of the present invention;

FIG. 15 illustrates an exemplary audit connection dialog sub-window; and

DESCRIPTION OF THE PREFERRED EMBODIMENTS

A network management system program and graphical user interface for a large-scale optical network is disclosed. In the following description, for purposes of explanation, numerous specific details are set forth in order to provide an understanding of the present invention. It will be evident, however, to those of ordinary skill in the art that the present invention may be practiced without the specific details. In other instances, well-known structures and devices are shown in block diagram form to facilitate explanation. The description of preferred embodiments is not intended to limit the scope of the claims appended hereto.

Aspects of the present invention may be implemented on one or more computers executing software instructions. According to one embodiment of the present invention, a server computer system transmits and receives data over a computer network or standard telephone line. The steps of accessing, downloading, and manipulating the data, as well as other aspects of the present invention are implemented by a central processing unit (CPU) in the server computer executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to embodiments of the present invention.

The instructions may be loaded into the memory of the server computer from a storage device, or from one or more other computer systems over a network connection. For example, a client computer may transmit a sequence of instructions to the server computer in response to a message transmitted to the client over a network by the server. As the server receives the instructions over the network connection, it stores the instructions in memory. The server may store the instructions for later execution, or it may execute the instructions as they arrive over the network connection. In some cases, the downloaded instructions may be directly supported by the CPU. In other cases, the instructions may not be directly executable by the CPU, and may instead be executed by an interpreter that interprets the instructions. In other embodiments, hardwired circuitry may be used in place of, or in combination with, software instructions to implement the present invention. Thus, the present invention is not limited to any specific combination of hardware circuitry and software, nor to any particular source for the instructions executed by the server or client computers.

Network Topography

Figure 1:
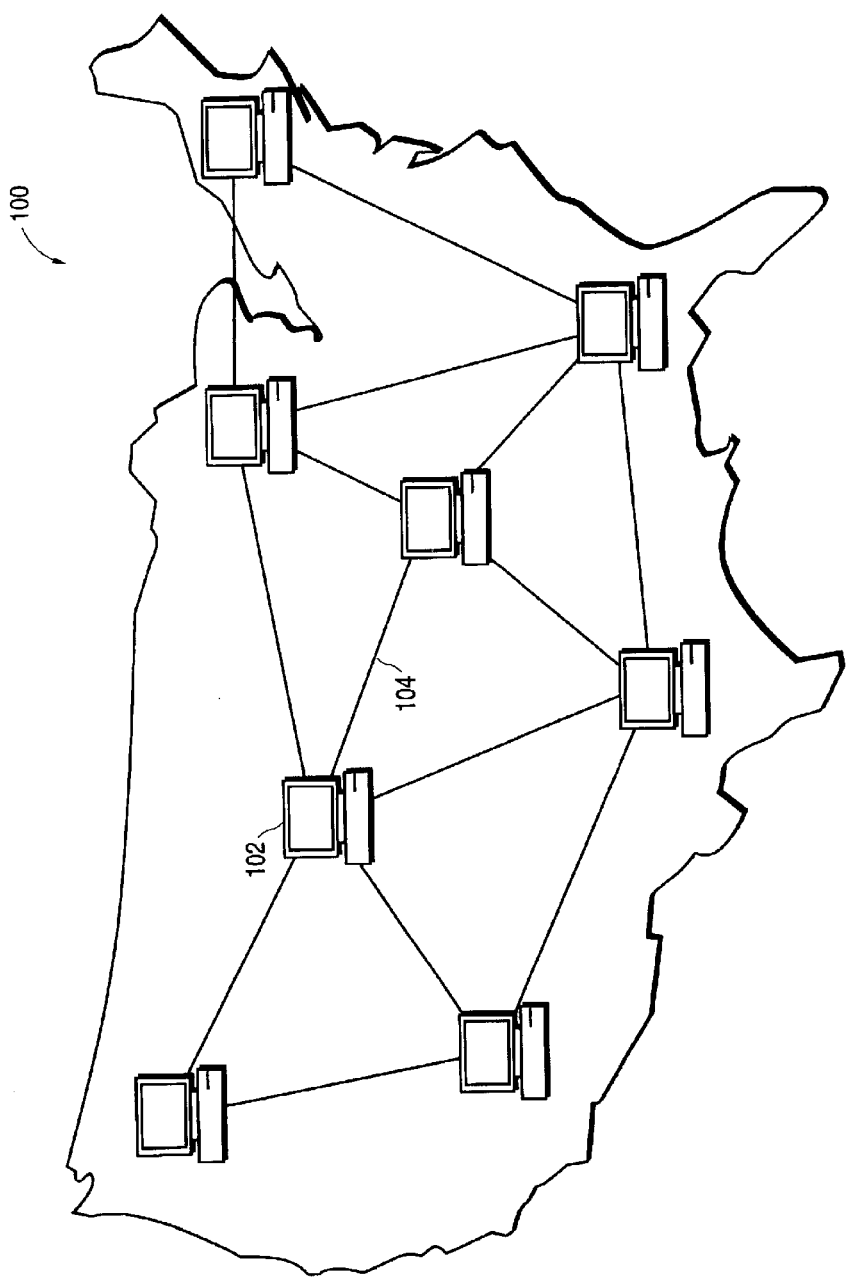
FIG. 1 is an illustration of a large-scale network that can implement embodiments of the present invention.

FIG. 1 illustrates a representation of a large-scale distributed network that can implement embodiments of the present invention. As shown in the display screen of FIG. 1, the network elements and links for a long-haul network stretched across the United States are displayed against a background map of North America. Network 100 consists of several network elements or nodes 102 coupled to one another in a series of links or spans 104. Although the exemplary network 100 is a large-scale network, it should be noted that embodiments of the present invention can be used for any type or scale of Wide Area Network (WAN), or similar network in which the distances between the network elements is significant.

In one embodiment, network 100 is a Synchronous Optical Network (SONET) system in which the media connecting the network nodes is fiber optic cable. SONET networks use two transmission paths between network nodes in a ring configuration. Each node represents a network element that is typically implemented as, or includes, a digital crossconnect system (DCS) or add-drop multiplexer (ADM). An add-drop multiplexer is a network device typically used by telecom carriers to switch and multiplex low-speed voice and data signals onto high-speed lines. These types of nodes are widely used with central office telephone switches and are typically used to aggregate several T1 lines into a higher speed electrical or optical line. A digital crossconnect is used to switch traffic between multiple SONET links, and serves to link high-speed lines to other high-speed lines. The ring that connects the nodes together in a SONET network is typically a bi-directional counter-rotating ring. This architecture facilitates the implementation of various protection measures. Any network is susceptible to various types of failures, at least to some degree. Such failures may include node failures, corrupted signals, damaged network lines, and other such failures. To minimize the risk of overall network collapse due to such a problem, a SONET ring includes two or more counter-rotating rings. One ring is referred to as the "working" ring or fiber path and the other ring is referred to as the "standby" or protection ring or fiber path. The working ring typically rotates clockwise and the standby ring rotates counter-clockwise around the network, however the actual directions of rotation for these rings may vary depending upon conventions adopted by the equipment manufacturers.

An entire SONET network often consists of complex ring and sub-ring structures. Establishing efficient paths between various network nodes is an important task of network designers and operators. Network management system programs often include routing routines that help designers determine optimum routes between network elements. Thus, for the network illustrated in FIG. 1, a network management system program is implemented on the network 100 to manage the design, modification, data traffic control, and other operational aspects of the network. A graphical user interface of the network management system can be configured to display an outline map of the territory over which the network spans, as shown in FIG. 1, in which the network is shown as superimposed over a map of the United States.

In general, the graphical user interface that allows a user to perform most network design and management tasks with point-and-click operations. Various different display screens comprise the graphical user interface. A hierarchical display list can be used to provide rapid navigation between display levels. The display of network topologies and configurations, as shown in FIG. 1, aids the designers and users in the design and operation of the network. Standardized icons are used to represent different types of network nodes, such as server computers, crossconnects, add/drop multiplexers, and so on. A snap-to-grid feature allows the positioning of network element icons precisely on the map background. In terms of physical implementation, network elements typically include rack-mounted cards that provide access to the network lines. The network management system programs usually include graphical shelf and card displays with configuration and status information that are provided for each displayed element.

In one embodiment, network equipment managed by the network management system is identified using common language equipment identification (CLEI) coding. This is a dynamic inventory management feature that tracks deployed equipment and provides equipment printouts. The network management system performs various different configuration management tasks, such as remote provisioning of equipment and crossconnects, inventory management, generating reports for network elements, network element synchronization and auditing, among other such tasks. The network management system also provides various performance management features, such as setting and retrieving performance thresholds, reporting of performance measurements and threshold crossing alarms, and other similar tasks. Besides performance and task management functions, the network management system can also perform security and fault management tasks, such as defining security levels based on user profile, generating event-based alarms, alarm severity mapping to cards and facilities, correlating faults to identify affected circuits, and other similar tasks.

In one embodiment of the present invention, a network management system provides crossconnect and connection management functions for various managed elements within a SONET network. For purposes of the following description, a managed element is a network element which provides transport and/or access services for SONET/SDH payload traffic. A physical termination point (PTP) is an actual or potential endpoint of a topological (physical) link. Examples are T1 ports, T3 ports, OC-N optical ports and OVTG ports. In general, only the OC-N, OVTG and EC-1 ports are linkable, that is, can have topological links. A connection termination point (CTP) is an actual or potential end point of a managed connection. For example, a CTP represents a logical channel or a timeslot on a physical link. Examples of connection termination points are the VT1.5, STS1, STS3C, STS12C and STS48C and WCH channels. Examples of SDH connection termination points are VC-3/VC-4/VC-11/VC-12, and so on. A termination point represents the termination points of topological links or termination points of a managed connection, and is basically an abstraction of CTP and PTP points. Examples of termination points are the T1/T3/OC-N ports and the STS1/STS3C/STS12C/STS48C timeslots.

A crossconnect relates two connection termination points. Traffic is carried between the connection termination points through crossconnects. A SONET crossconnect connects STS (Synchronous Transport Signal) or VT (virtual tributary) time-slot facilities, and can connect a high speed time slot to another high speed time slot, or a low speed time slot to another low speed time slot. A crossconnect has a direction and a rate. The different directions are one-way and two-way, and the different rates are VT1.5/STS1/STS3C/STS12C/STS48C. There can also be special types of crossconnects like the redline crossconnects, service selection crossconnects and bridge crossconnects. In general, only connection termination points of the same rate and type can be crossconnected.

Figure 2:
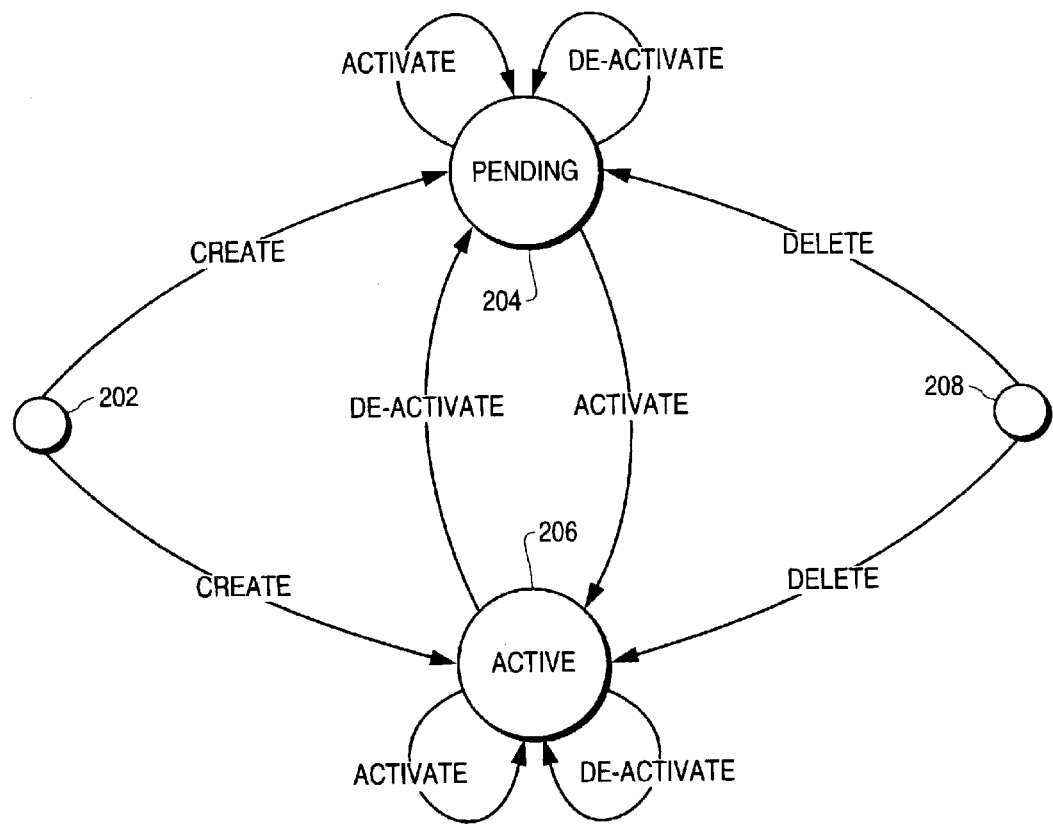
FIG. 2 illustrates a state diagram for a crossconnect, according to one embodiment of the present invention.

There are basically two different states for a crossconnect in the network management system of the present invention, that is, pending and active. A pending crossconnect does not exist in the network element, and an active crossconnect exists in the network element. FIG. 2 illustrates a state diagram for a crossconnect, according to one embodiment of the present invention. Upon creation 202, a crossconnect is either in a pending state 204 or an active state 206, until it is deleted 208. A pending crossconnect can be activated to become active, and an active crossconnect can be de-activated to become pending.

A route is an ordered series of connection termination points, physical termination points, and topological links through which a connection traverses. It could be the working (primary) or protection (secondary) route of a connection. Any connection termination point can be the source or destination of a route. A route can be either unidirectional or bidirectional. A bidirectional route will have two unidirectional routes in opposite directions. A topological link is a physical link between two physical termination points. The rate of a topological link is determined by the rate of the two physical termination points at each end, and these must generally be of the same rate. Examples are the optical fiber/coaxial cable links like OC-n/EC-1 links.

A managed connection within the present network management system is basically an end-to-end connection between a source connection termination point in one network element and a destination connection termination point or points in one or more other network elements. A connection can be composed of multiple routes depending on the protection level. The different protection levels are fully protected, partially protected, and unprotected. A fully protected connection has at least one alternate route for all legs, an unprotected connection has no alternate route, and a partially protected connection is one in which some, but not all of the legs have alternate routes. In addition, connections can be classified as unidirectional, bidirectional, and broadcast.

Figure 3:
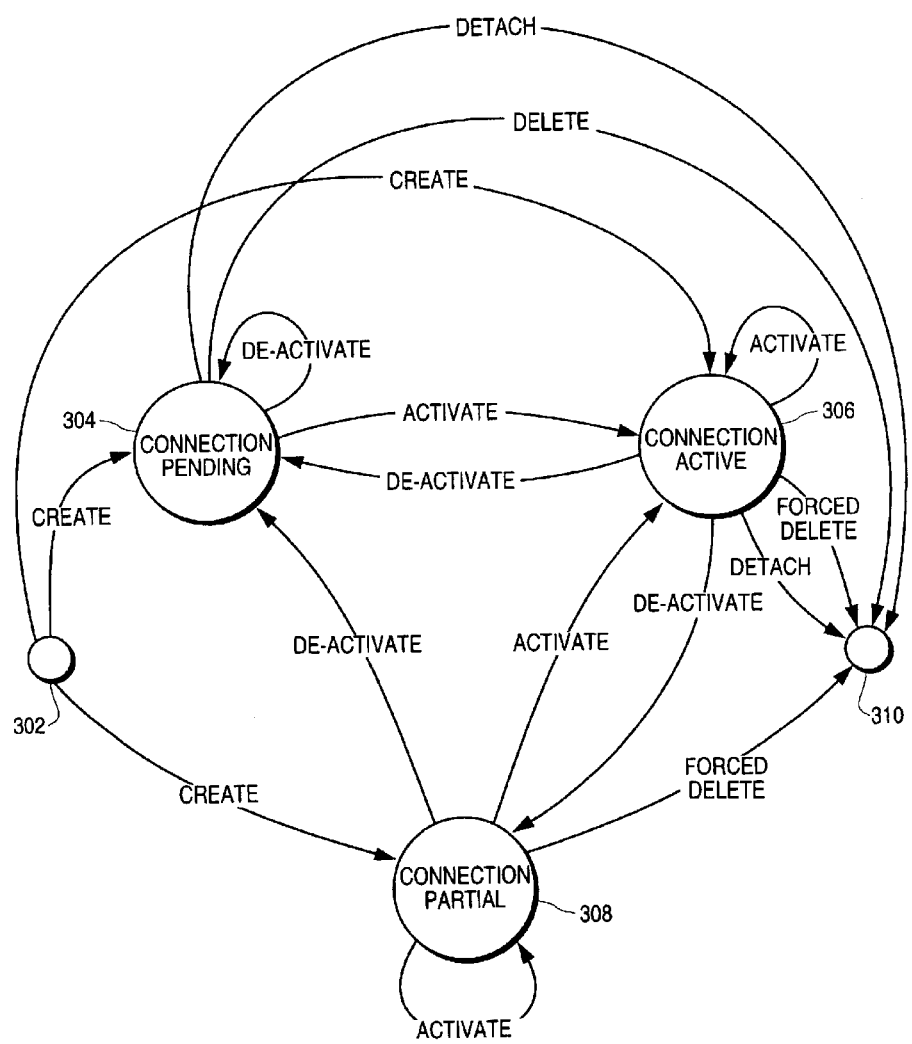
FIG. 3 illustrates a state diagram of a connection, according to one embodiment of the present invention.

A connection can be in three different states, that is, pending, active, and partial. A pending connection is one in which all of the crossconnects are in a pending state; and active connection is one in which all of the crossconnects are in active state; and a partial connection is one in which some of the crossconnects are pending and the others are active. FIG. 3 illustrates a state diagram of a connection, according to one embodiment of the present invention. Upon creation 302 and before deletion 310, a connection is either in a pending 304, active 306, or partial 308 state. A crossconnect within the connection can either be activated or de-activated to change the state of a connection from one state to another. Any connection can be deleted 310 through a detach or delete operation. As shown in FIG. 3, a pending connection 304 or partial connection 308 can be made into an active connection through an activation operation. Likewise, an active connection 306 can be made into a partial connection 308 or pending connection 304 through a de-activate operation.

In one embodiment of the present invention, the network management system includes a connection routine that creates connections between network elements. Connections are created in the SONET path layer of the network topology. Hence, photonic and other non-path terminating network elements are not considered. It should be noted that the term "connection" hereinafter, refers to SONET connections.

There are two general ways of creating connection. One way is by manual routing, and the other way is through automatic routing. In the automatic routing method, routing routines within the network management system generate the route automatically based on the network topology and other criteria. The user specifies the source, destination connection termination point and other parameters like protection level, rate, and other such parameters. Unlike the manual routing method, the system can generate a protected or an unprotected connection without the user having to specify the route explicitly. The automatic routing scheme may employ one or more route optimization features, such as least cost routing or other similar methods to achieve route efficiency.

In the manual routing method, the user specifies the complete route by selection the network elements in the route and creating all the crossconnects. The system aids the user in navigating through the network. The system provides a graphical interface and also a textual interface for creating/deleting the crossconnects. It also gives the flexibility to define any type of connection. It is up to the user to specify a valid route for the connection. The system also provides a limited validation function which will validate the cross connects, links, timeslots, and so on. It is important to note that in this method, the user is responsible for ensuring that the connection is protected by provisioning appropriate crossconnects (if the user needs protection for the connection). In the manual routing system, the network management system program will not automatically provision any of the network elements, such as crossconnects, for the user.

A manually generated connection is basically an aggregation of crossconnects in network elements. In one embodiment, the network management system does not enforce any constraints on route selection. It is the user's responsibility to create valid connection though the system. In one embodiment, the system can be configured to warn the user in the event that an invalid connection or configuration is selected, and to suggest to the user a possible valid selection. The lack of strict and automatic constraint selection allows the use of configuring temporary connections and processing work orders for proposed connections. It can also be used for designing a management connection with the help of limited validation from the system.

Figure 4:
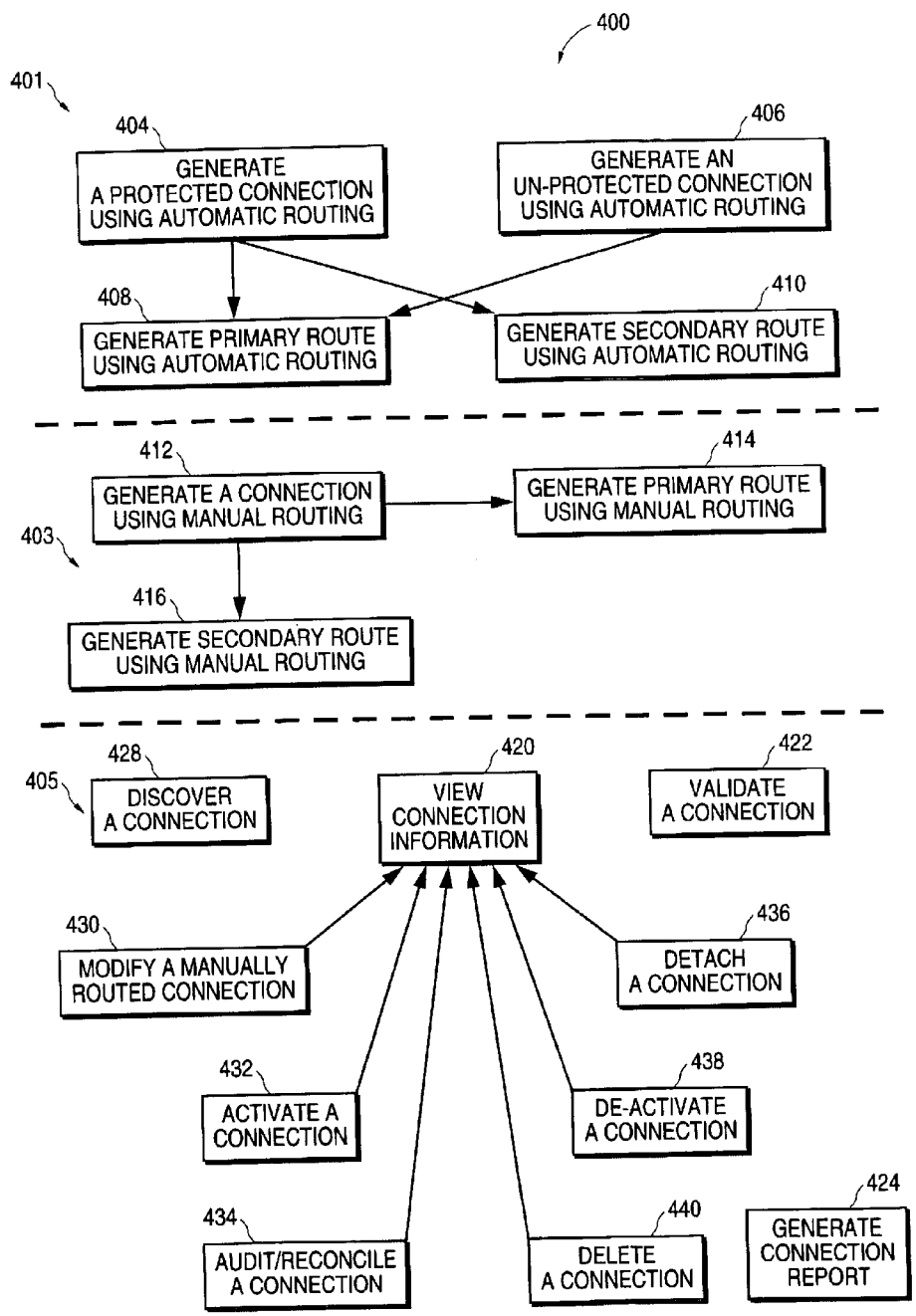
FIG. 4 is a flow diagram that broadly outlines the steps involved in managing connections using the network management system, according to one embodiment of the present invention.

FIG. 4 is a block diagram that broadly outlines the processes and steps involved in managing connections using the network management system, according to one embodiment of the present invention. The connection management system 400 contains various modules that manage various connection functions. As stated above, a connection can be generated using automatic routing or manual routing. Moreover, a connection can be configured to be either protected or unprotected. Module 401 illustrates the general processes of generating a connection using automatic routing. A protected connection can be generated using automatic routing, as shown in process 404. In this case, a primary route is generated using automatic routing, step 408, and a secondary route is generated using automatic routing, step 410. If an unprotected connection is generated using automatic routing, as shown in process 406, only a primary route is generated using automatic routing, step 408.

Module 403 illustrates the general processes of generating a manual connection. A connection is generated using manual routing, step 412. In this step, a primary route is generated using manual routing, step 414, and, in the case of a protected connection, a secondary route is generated using manual routing, step 416. It should be noted that, in certain implementations, a mixed automatic-manual routing scheme may be implemented. For example, a protected connection can be configured using an automatically routed primary route and a manually routed secondary route, or alternatively, a manually routed primary route and an automatically routed secondary route.

Once a connection is generated, the network management system 400 allows the user to perform various different operations with regard to the connection, as shown in module 405. The connection management system 400 includes sub-modules to discover a connection 428, validate a connection 422, and generate connection reports 424. The system 400 also includes a sub-module 420 for viewing connection information. This sub-module allows a user to perform various tasks, such as modifying a manually routed connection 430, activating a connection 432, deactivating a connection 438, auditing or reconciling a connection 434, detaching a connection 436, or deleting a connection 440. In general, each of the sub-modules within module 405 includes a separate graphical user interface that is displayed to the user.

The graphical user interface for the network management system program comprises a series of hierarchical display windows. These can include a details window, report window, search dialog, discovery dialog, and audit/reconcile dialog, among other such windows. FIG. 5 illustrates the connection management display screen for a graphical user interface utilized by the network management system program, according to one embodiment of the present invention. The graphical user interface display window 500 comprises a details window that allows a user to administer new and existing connections. Details window 500 includes a series of menu options 502 that allows the user to access various connection management functions. These include a Save option, which saves the current connection; Delete, which deletes the current connection; Activate, which activates the current connection; Deactivate, which deactivates the current connection; Detach, which detaches the current connection; Validate, which validates the current connection; Audit, which audits and reconciles the crossconnects in the current connection; and Discovery, which discovers a connection starting from a specified TID and AID. A connection detail display area 504 provides fields that allow the user to specify the name, dimension, status, and rate of a connection. It also provides a display area 506 that shows various attributes of the connection, such as the contact information for the connection or network element administrator.

The details window 500 also includes various function buttons 508 that allow the user to configure the crossconnects within a connection. These buttons include functions such as Add Network Element, which selects a network element from a list of all available network elements; Launch Crossconnect Manager, which launches the crossconnect manager for a selected network element; Update Crossconnect Managers, which updates all open crossconnect managers; and Set/Unset Connection Source, which sets the selected network element and "From AID" as the connection's source. Once the user sets the selected network element as a source, the Set Connection Source button changes to "Unset Connection Source". The Set/Unset Connection Destination sets the selected network element and "To AID" as connection's destination. Once the user sets the selected network element to destination, this button changes to "Unset Connection Destination". The Get Next Network Element button gets the next network element and the corresponding connection termination point that is linked to a network element.

The add network element dialog (not shown) is invoked from the "Add Network Element" button on the details screen. The dialog displays a list of the network elements currently available in the network management system program. The user can select one or multiple network elements from the list and add them to the current connection.

The details window 500 includes a detailed connection display area 510, which displays various items of information related to a one or more pending or active connections. The connections are displayed in numerical order within display area 510, and depending upon the size of the display screen, up to, e.g., five to ten connections can be displayed at one time. As shown in the example of FIG. 5, information for each connection can include the identifier (ID) for the source and destination nodes, the rate, type and status of the connection, as well as the state of various operations on the connections. The details window 500 can also include simplified connection source and destination information display areas 512. These can include the identifiers of the source and destination nodes for each connection, without any extraneous detail information. Detail or report screens concerning the connections can be generated by activating either the details 514 or reports 516 option buttons displayed in window 500.

There are several steps involved in generating a manual connection. These steps generally require the user to add general connection attributes, add a network element in the route, provision the crossconnects in the network element, select the source and destination connection terminal points. The network management system program allows the user to edit a connection before saving or activating it. Editing a connection involves changing the connection attributes, deleting a network element in the route that was previously added, deleting crossconnects in a network element in the route, and changing the source and/or destination connection terminal points.

Figure 6:
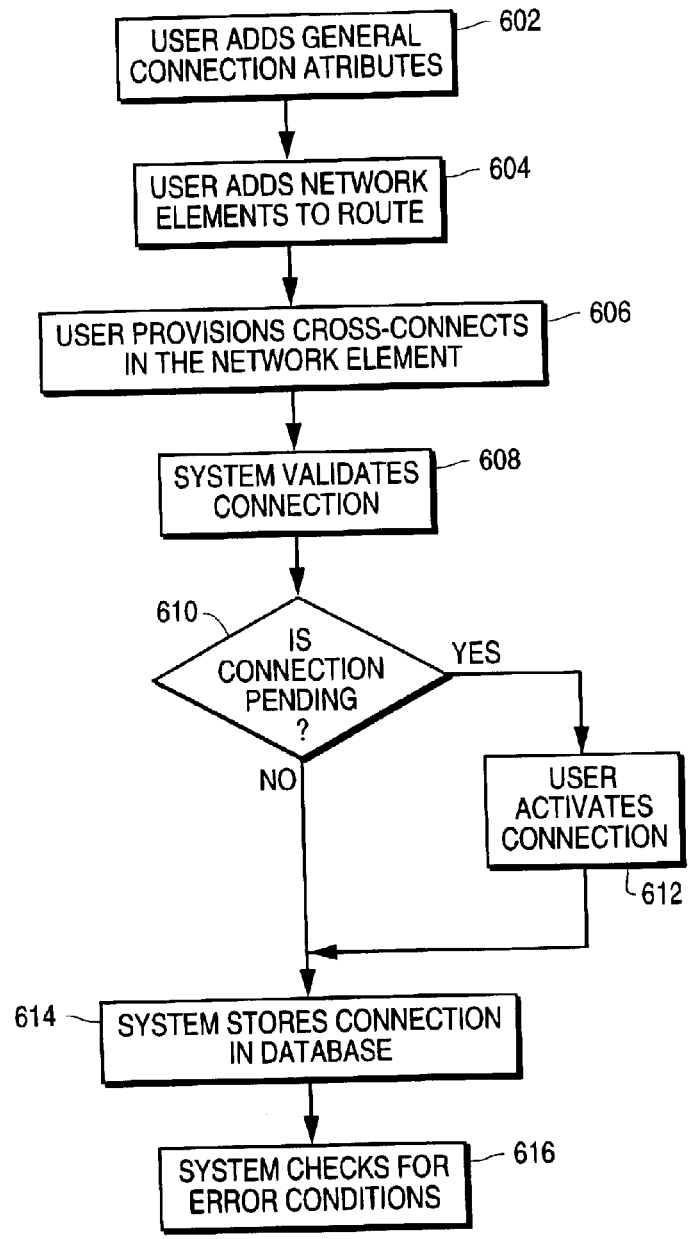
FIG. 6 is a flowchart that illustrates the steps of generating a connection using manual routing, according to one embodiment of the present invention.

FIG. 6 is a flowchart that illustrates the steps of generating a connection using manual routing, according to one embodiment of the present invention. In step 602, the user adds (or changes) general connection attributes. In this step, the user inputs or changes the following attributes: the name of the connection, which is a unique ASCII character string without spaces (this can also be thought of as a connection ID); the direction of the connection, which can be one-way, two-way, or broadcast; customer attributes, such as customer name, description, contact address, contact number, order number, and so on. Of the above attributes, the direction attribute might be used for validation of the connection and/or in the reports. They are not used to enforce any constraints on the route selection.

In step 604, the user adds a network element to the route. In this step, the user first enters a network element in the route. This may be a source, destination(s) or intermediate network element. Depending upon the user interface implementation, the network element can be entered from a textual interface or a graphical interface, such as from a menu list or drag and drop element. The network management system adds the network element to the list of network elements in the route of the connection. It also presents this list to the user. This list is populated with network elements and cross connects as the user specifies the route. In general, the user can add any number of network elements to the route in this way.

The user next invokes a graphical screen for provisioning crossconnects in a network element, step 606. In one embodiment, the network management system provides a way for the user to invoke a crossconnect management graphical user interface by selecting a network element. The system presents the graphical screen to the user and displays all the existing crossconnects, which may or may not be used by other connections, and the pending crossconnects that are reserved by other connections. The system may be configured so that it does not allow the user to delete any of the existing crossconnects. The display interface distinguishes all of the crossconnects so that it is easy for the user to differentiate them.

In provisioning the crossconnects in a network element, the user has the option to provision the crossconnects using the graphical screen or to directly input the crossconnects using a textual interface by specifying the source AID, destination AID, direction, rate and other attributes of a crossconnect. For the textual interface to input the crossconnects, initially, the system performs a limited validation. In this case, it is up to the user to ensure that the crossconnects are valid, otherwise they will be denied by the network elements. If the user prefers the graphical screen, the system allows the user to provision more than one crossconnect to be part of the connection. The user can either add new crossconnects (non-existing in the network element), or select existing crossconnects (either active or pending) and add them to the route. The user can go back and edit/modify the provisioned crossconnects (only those belonging to this connection) by deleting already added crossconnects and adding any new crossconnects. The system provides a way for the user to select the source CTP (s) and/or destination CTP(s) in this network element. The user can select either or both of them at any time. Once this is done, the user indicates to the system to add all those crossconnects to the route and also updates the source and/or destination CTP(s) information (if any) of the connection. The system adds the crossconnects to the route and updates the list with the crossconnects. For any crossconnect the user adds to the connection, the user can invoke a function to get the next network element in the route. The system traces the link from the associated physical termination point to the network element (if any) and to the associated PTP/CTP on the linked network element and then adds it to the route.

In step 608, the network management system provides a limited validation function which will validate the connection. The user can invoke this function to validate a connection before the connection is stored in the database or activated in the network. The network management system validation function reports any inconsistencies to the user, and is generally an optional step. After the validation operation, the system allows the user create the connection in a pending state. Thus, in step 610 it is determined whether the connection is pending. If it is a pending connection, the system waits until the user activates the connection, step 612. Once the connection is activated, the system stores the connection in the database, step 614. The system can also be configured to check the connection for errors, and report the status to the user with an error report, if any, step 616.

Upon creation of a manual connection, the network management system generates a connection object in the database with all the information entered by the user. If any unknown exceptions occur and the system cannot recover from it, it reports the same to the user and does not save the connection. Various conditions can trigger an exception or error condition. For example, the system ensures that the connection name is unique. If it is not, the user is prompted to enter a unique name for the connection. The system also ensures that the course of the connection is not duplicative of any other connection. That is, if the new connection has exactly the same crossconnects as any other connection, the system reports this to the user and does not save the connection.

Crossconnect Management

As stated above, a manually generated connection is an aggregate of crossconnects in one or more network elements. As illustrated in step 606 of FIG. 6, a step in generating a manual connection is the provisioning of crossconnects in the network element(s). In one embodiment of the present invention, the network management system program includes a crossconnect manager window interface and one or more executable subroutines or modules for provisioning crossconnects within network elements.

Figure 7:
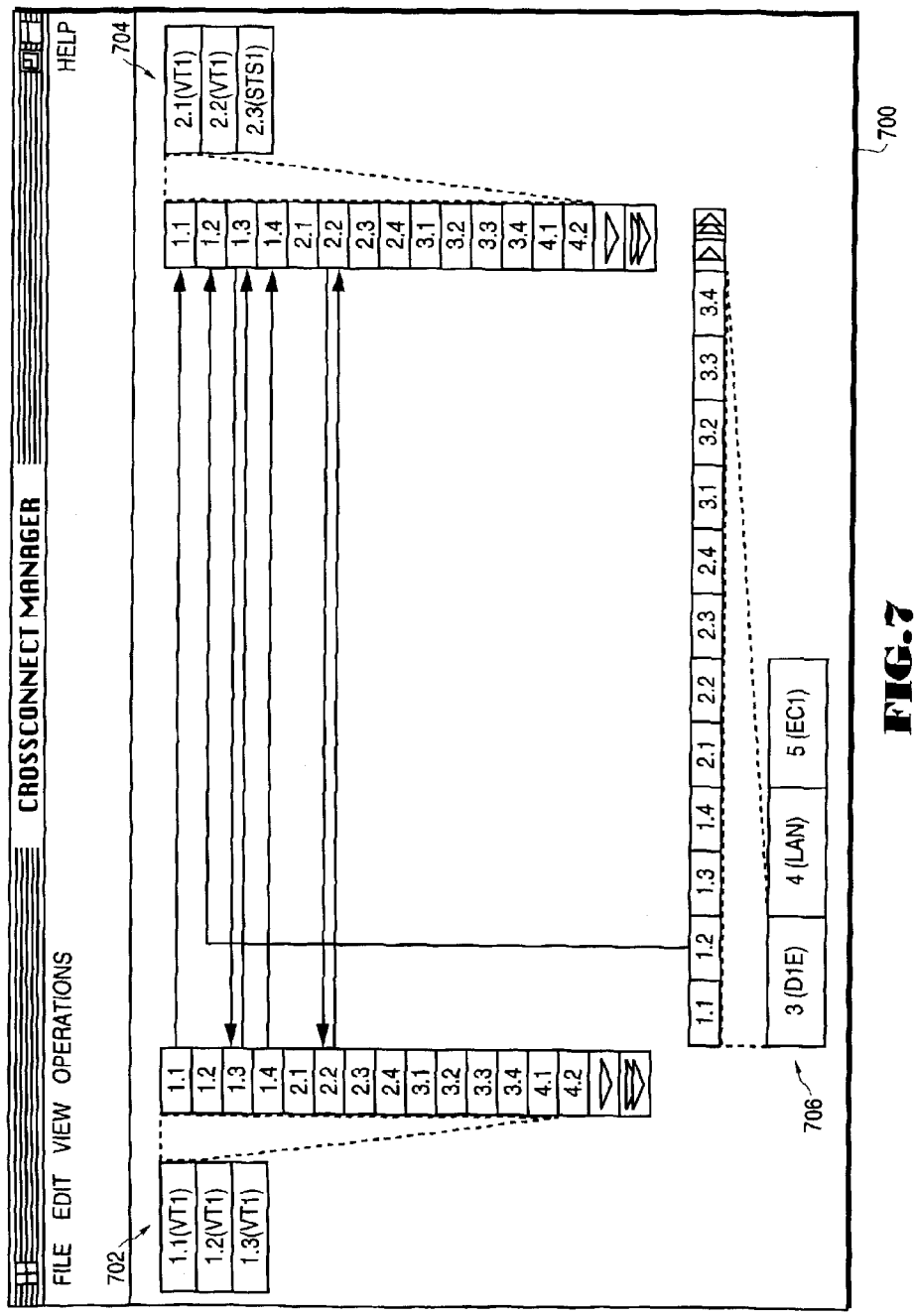
FIG. 7 illustrates the crossconnect manager window display screen, according to one embodiment of the present invention.

In one embodiment, the crossconnect manager window is invoked from the "Launch Crossconnect Manager" button on the details window 500 of FIG. 5. FIG. 7 illustrates the crossconnect manager window display screen, according to one embodiment of the present invention. Depending on the actual network implementation, many different types of crossconnects may be provisioned including SONET, SDH, DS0, T1, and similar crossconnects. For the embodiment in which network 100 is a SONET network, only SONET crossconnect information is displayed and some of the toolbar buttons are specific to connection management. In general, a SONET crossconnect connects STS or VT timeslot facilities. The display area 700 features an east-west-south orientation that allows for the display of crossconnects among three separate network nodes. In FIG. 7, these nodes are denoted node 1.1 (VT1) 702, node 2.1 (VT1) 704, and node 3 (DIE) 706. The rectangles (e.g., 1.1, 1.2, and so on) associated with each node represent time slots or ports (or groups of time slots or ports) for each node. The directional lines connecting the various time slots represent the crossconnects. The graphical user interface illustrated in FIG. 7 facilitates easy display and creation or modification of crossconnects between network nodes.

Figure 9:
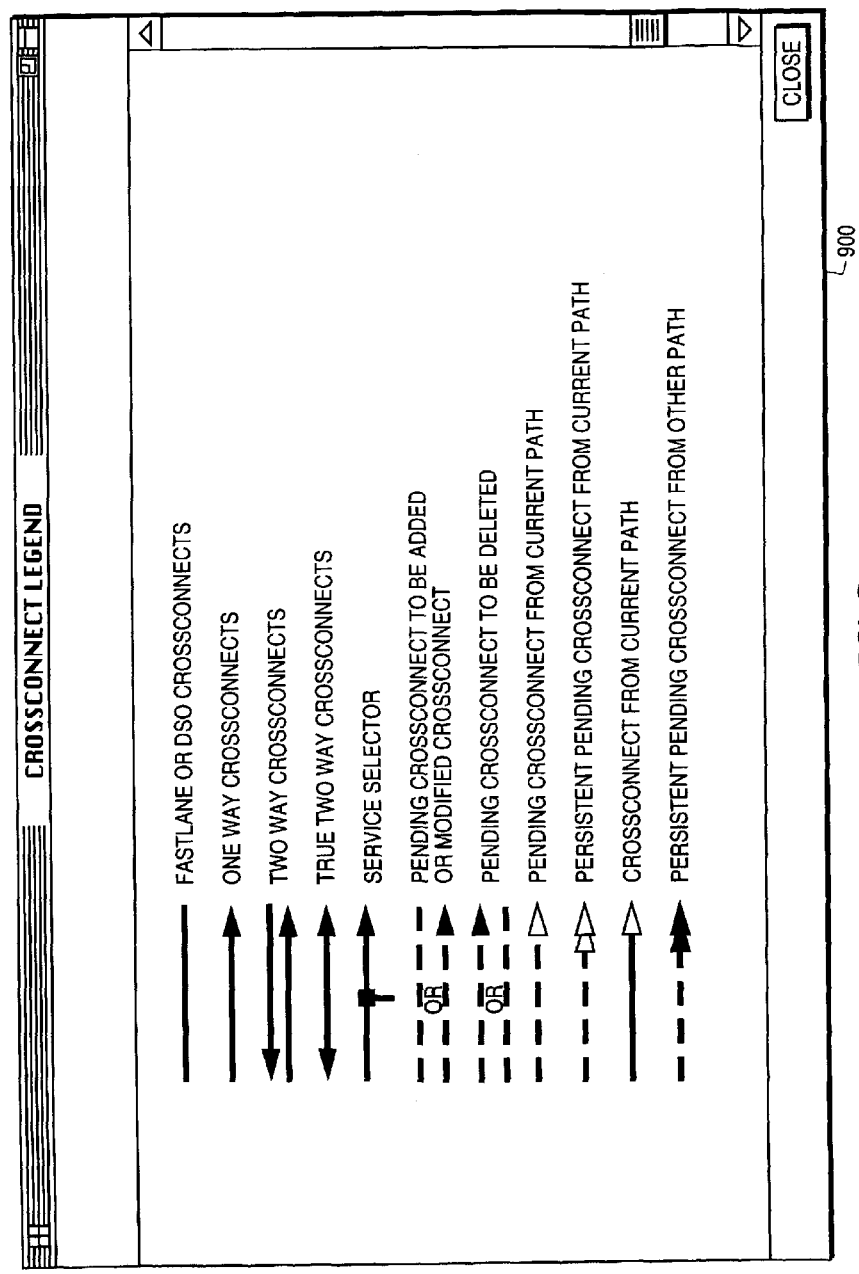
FIG. 9 is a legend dialog window that illustrates some exemplary crossconnect line types, according to one embodiment of the present invention.

The network management system program allows for the creation and modification of crossconnects between network elements. In one embodiment, the graphical user interface is configured such that the display of the various displayed crossconnect elements can be varied depending upon their status. For example, the size and shape of the lines and arrows representing the crossconnects in window 700 can be altered depending upon their type (e.g., one-way, two-way, and so on) or status (e.g., pending, active, and so on). FIG. 9 is a legend dialog window 900 that illustrates some exemplary crossconnect line types, according to one embodiment of the present invention. As shown in FIG. 9, various different line types can be used to represent different types of crossconnects or the status of the crossconnects within the network management system program.

Depending on the actual network implementation, a large number of crossconnect channels (such as up to 32 channels) can be configured for each network element. This can pose a display problem when crossconnect maps are displayed on monitors with limited viewing area. Most graphical user interfaces provide a scrolling capability that allows the user to scroll through multiple displayed elements when the viewable range of the monitor is exceeded. To overcome disadvantages associated with present scrolling mechanisms, one embodiment graphical user interface of the present invention includes a synchronized scrolling function for the attribute lists that allows corresponding connections between source and destination pairs of network elements to be displayed in synchronization with one another.

Figure 8:
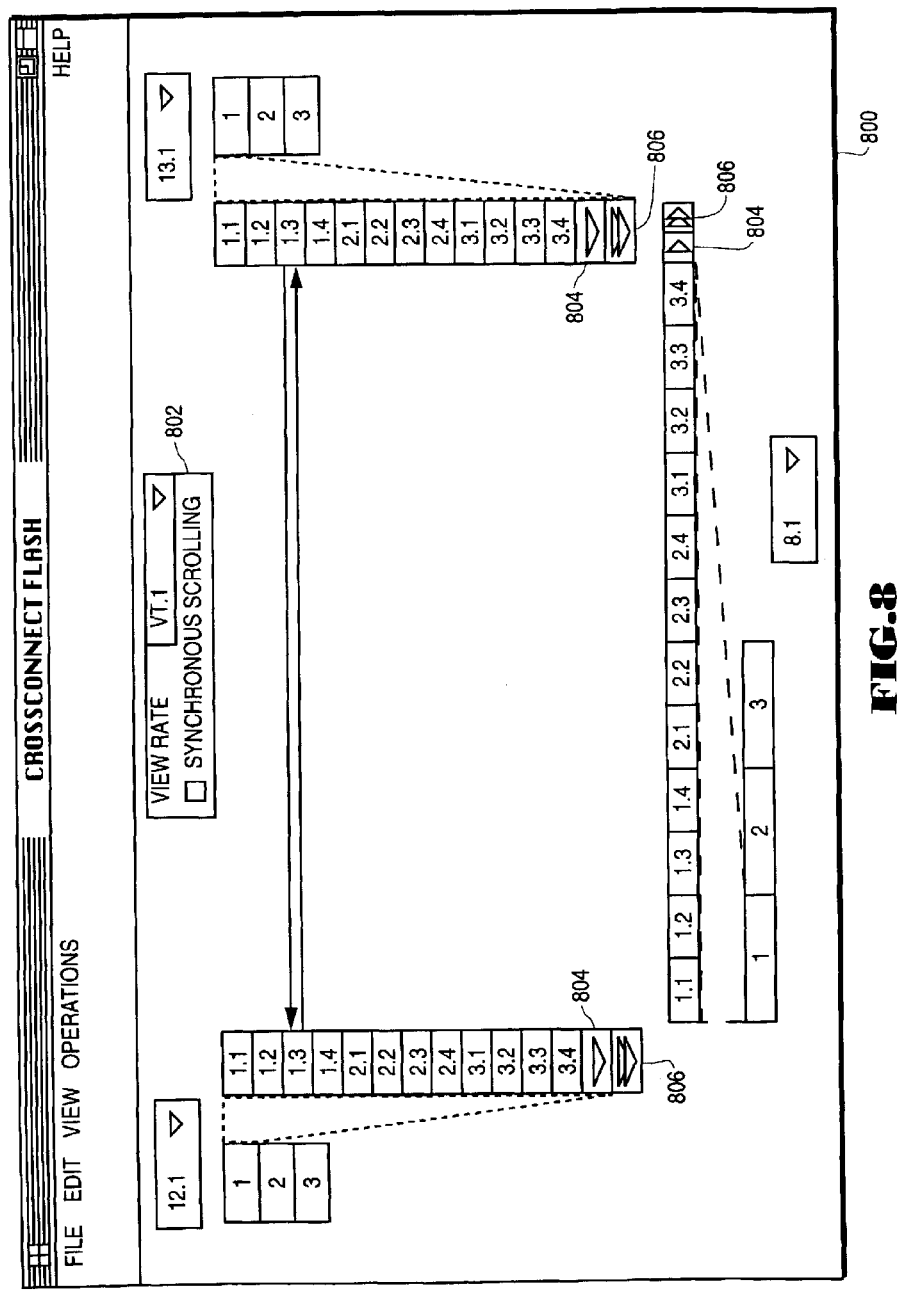
FIG. 8 illustrates a crossconnect manager window display screen that implements a synchronized scrolling feature, according to one embodiment of the present invention.

FIG. 8 illustrates a crossconnect manager window display screen that implements a synchronized scrolling feature, according to one embodiment of the present invention. As shown in window 800, scroll bar function buttons are provided beneath or adjacent to the channel column of each network element. As shown in FIG. 8, a single scroll function 804 is provided to allow the user to scroll the channels within a network element one channel at a time. A fast scroll function 806 is provided to allow the user to continuously scroll through all of the channels of a network element. A scroll synchronization function 802, couples and synchronizes the scrolling function between pairs of channels for source and destination network elements. With this function, if the user scrolls among the channels for one network element, the channels for the connected network element are scrolled in tandem. This eliminates the need for the user to first scroll the source network element to a particular channel, and then scroll the destination element to the same channel, which is an especially inconvenient task for networks with a great number of channels.

Thus, for the example illustrated in FIG. 8, with the synchronized scroll function 802 enabled, scroll button 804 for network element 12.1 would serve to scroll the display in both network elements 12.1 and 13.1 simultaneously by one channel at a time, and scroll bar 804 would serve to continuously scroll the display in both these network elements simultaneously. Using this function, the connections between analogous channels of two network elements can be tracked.

In one embodiment, the crossconnect channel lists are constructed as simple data structures within the network management system program. The graphical user interface controls the construction of the graphical elements comprising the channels on the display of the user terminal. The synchronized scrolling routine is implemented as a function that couples a reference portion (e.g., the channel number) of a defined pair or group of attributes, such as crossconnect lines. Thus a scrolling action performed on one table will trigger the identical operation on the coupled network element or table. If the coupled tables are not originally aligned, such as with respect to channels being displayed, a pre-synchronization function first aligns the second table to the first table, so that synchronized scrolling operation is performed with respect to the same reference. Although the scrolling function buttons were illustrated in a certain position and orientation in FIG. 8, it should be noted that various alternative positions are possible with relation to the attribute tables. For example, the scroll function buttons can be placed alongside each table in a different position, or a single set of scroll buttons can be provided for two or more tables.

In one embodiment of the present invention, the network management system includes a trace function that allows the user to determine a connection for a time slot that is not fully visible in the display area of the graphical user interface. The trace function is accessible through a pop-up menu accessible through the user interface. The trace function can be configured to display the path connections from a selected time slot, or display the time slots connected to a selected path connection.

Various functions are accessible to the user through pop-up menus or similar interface mechanisms. Besides the trace function described above, functions such as displaying a current crossconnect line, set redline for a crossconnect line, and similar functions.

Using the graphical user interface illustrated in FIG. 7, a user can provision a crossconnect by simply drawing a line from a channel in the source network element to a channel in the destination network element. The user can then define the type of crossconnect by specifying the line type, as shown in FIG. 9. In general, a created crossconnect can be defined as pending until it is activated or deleted. A redline function is provided that allows a crossconnect to be marked as a modified crossconnect.

Once crossconnects within network elements have been defined, reports can be generated that display relevant information regarding the network links. The network management system program includes a crossconnect report function that displays pertinent information relating to the pending or provisioned crossconnects. FIG. 10 illustrates a crossconnect report display screen, according to one embodiment of the present invention. The report screen display area 1000 lists all crossconnects that exist on the selected network element, and certain relevant information is displayed for a number of channels, e.g., channels 1–18. Various function buttons 1002 allow access to functions such as: Generate, which reloads the current report from the database; Previous, which gets the previous set of records; Next, which gets the next set of records; Print, which print the current report; Filter, which applies one or more filters to the current report; Sort, which sorts the current report; Columns; which hide or show columns from the current report; and Deselect, which deselects the currently selected row. From the connection summary report a connection can be selected and displayed in the main details screen.

The display fields 1004 within the report screen 1000 list various items of information, such as the starting and ending points of the crossconnect, the name/rate/type of crossconnect, bridge access identifier (AID), as well as other types of information. The report can also display whether a crossconnect is a redline crossconnect. A redline crossconnect is a crossconnect that has been marked to be changed. The change takes effect when an update network element process is executed. The crossconnect manager report display illustrated in FIG. 10 is intended primarily for purposes of illustration, and many other types of information regarding the network element crossconnects can be compiled and displayed.

Connection Management

Once the crossconnects for the network elements have been defined, the network connections are created, validated and stored in the network management system database. FIG. 6 illustrates the general steps in generating a network connection. The network management system program includes a facility that allows a user to modify the general attributes and routes of created connections. This is illustrated as process 430 in FIG. 4.

Figure 11:
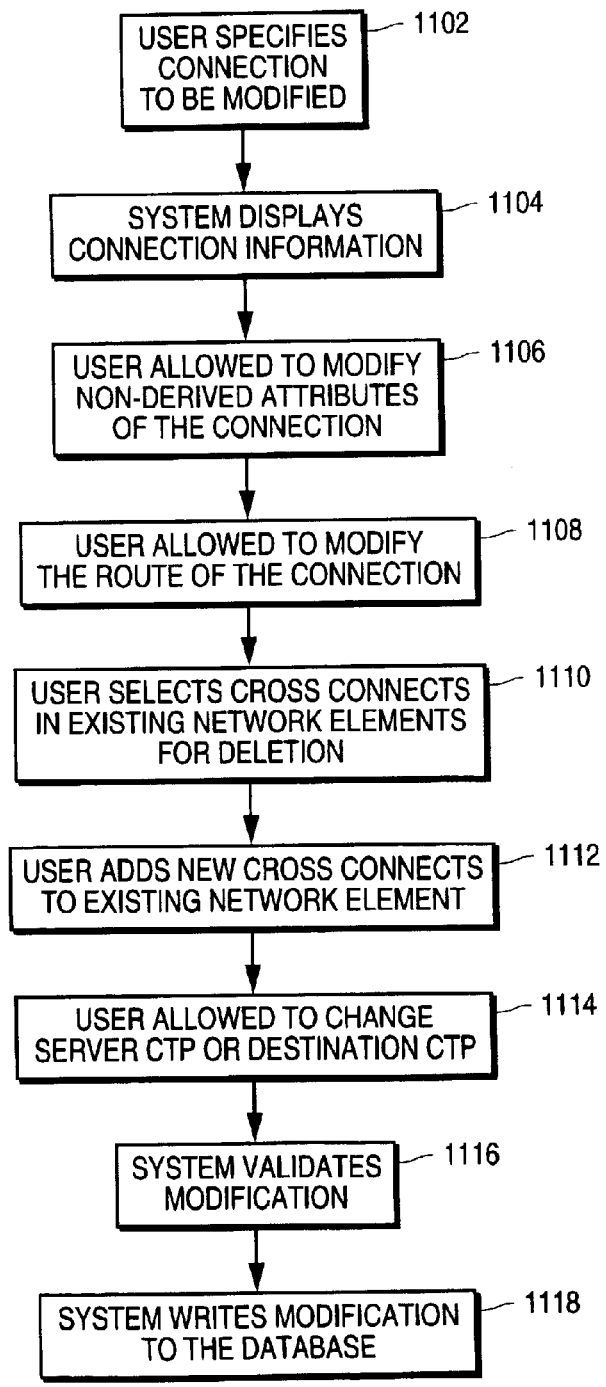
FIG. 11 is a flowchart that illustrates the process of modifying a manually generated connection, according to one embodiment of the present invention.

FIG. 11 is a flowchart that illustrates the process of modifying a manually generated connection, according to one embodiment of the present invention. In this process, the user first enters the name of the connection to be modified, step 1102. The system then displays the connection information to the user, step 1104. This information can include general connection information, such as user entered attributes like Name, Direction, Customer attributes, and derived attributes like rate, which is derived from the rate of the crossconnects, and the state of the connection which indicates whether it is active, pending or partial. The system also displays the entire route of the connection. The system shows every crossconnect in the route, as shown in FIG. 7, and which includes the attributes illustrated in FIG. 10. The system then displays the connection information to the user through the user interface. The system keeps track of the user accessing the connection information. If no connection exists with the given name, the system warns the user and prompts for another selection to be made. If the system cannot complete the operation and cannot recover from it, it notifies the user of the same.

The system allows the user to modify the value of any attribute with the exception of derived attributes like the rate and state of the connection, step 1106. It also allows the user to define new custom attributes or delete any existing ones. The system allows the user to modify the route of the connection allowing the addition of a network element, step 1108. In this step, the user selects the network element to be added from a list of network elements, and the system adds it to the list of network elements in the route.

As shown in step 1110, the system provides a way to select the crossconnects in the existing network elements in the route for deletion either graphically or textually. In this step, the user selects an existing crossconnect in one of the network elements for deletion. The system checks to see if that crossconnect is part of other connections. If it is not, it marks the crossconnect for deletion. Otherwise, it marks it for breaking the association with this connection.

The system provides a way for the user to add new crossconnect(s) to one of the existing network elements in the route, step 1112. In this step, the user selects a network element, and the system presents the graphical screen for provisioning crossconnects, such as FIG. 7. The user either provisions new crossconnects or selects existing ones. Once the user finishes provisioning crossconnects, this is indicated to the system. The user can also enter the new crossconnects textually. The system adds the crossconnects to the route in the connection. The system traces the link to the associated PTP and the CTP and presents the same information to the user.

As shown in step 1114, the system allows the user to change the source connection termination point and/or destination connection termination point at any time. The user changes either the source or destination CTP(s) or both, and the system reflects the change in the connections information.

In general, the network management system does not enforce any particular order of the steps 1106 through 1114 in FIG. 11, and the user can execute those steps in any order. Once the user indicates to the system that the modifications are complete, the system can provide a limited and optional validation function which will validate the connection by checking for continuity (broken or no links), time-slot consistency and consistent direction, step 1116. The system then confirms the modification and then saves it to the database, step 1118. If the state of the connection is active before modification, the system tries to activate any new crossconnects that are added as part of modification. If the state of the connection is anything other than active, it is just saved to the database. The system reports the status of all the commands, that are sent to the network element, to the user. The system finishes by updating the connection information in the database and/or network.

Once a connection is created and/or modified, it is activated through the activation process 432 illustrated in FIG. 4. The activation process allows the user to activate a pending connection or a partially pending connection. A pending connection is one in which either all or some of the crossconnects are in a pending state waiting to be activated in the network. If there are any pending crossconnects in the connection, the system sends the appropriate commands to activate each crossconnect in the network elements. The system shows the status of each crossconnect command being sent to the network elements by dynamically updating the status of each command, in real time, according to the response from the network elements. After all the commands have been sent and their responses received, the system notifies user of the status of the activation. The status indicates whether a connection is complete (all the commands were successful), failed (all commands failed), or partial (some of the commands were successful). The status of the connection is then appropriately. If the activation status is not successful, the system reports to the user all the crossconnects that failed. The system updates the state of the connection including the state of the each crossconnect in the database according to the command responses from the network element. If the system cannot complete the operation and cannot recover from it, the user is notified.

A created connection can be deactivated as shown as process 438 in FIG. 4. This process allows the user to deactivate connections in the network. The crossconnects associated with the connection will be deleted only from the network elements in the connection's route and not from the connection itself. These crossconnects will still be part of the connection and will be in a pending state. As such, the crossconnects and the connection will still be stored in the system database. The system deactivates all the active crossconnects associated with the connection. After a successful deactivation, all the crossconnects in the connection will be in the pending state.

For all the active crossconnects (either redline or non-redline) that are not used by other connections, the system sends the commands to delete each of those in the network elements and changes their state to pending after successful completion from the network element. For all the active crossconnects that are used by other connections, the system does not do anything for those crossconnects. The system will not deactivate a higher order crossconnect. The system shows the status of each crossconnect command being sent to the network elements and dynamically updates (in real-time) the status of each according to the response from the network elements. After all the commands have been sent and their responses received, the system notifies user the status of the deactivation. The status indicates whether the operation was complete (all the commands were successful), failed (all commands failed), or partial (some of the commands were successful). The state of the connection is then updated appropriately.

As shown in process 436 in FIG. 4, connections can be detached from the system as well. The connection detach process allows the user to break the association between the crossconnects and the connection. The connection will be deleted from network management system database. The crossconnects are still maintained in the database (whether or not they are part of other connections) as well as in the network elements. Only the pending crossconnects that belong to the connection will be deleted from the database, along with the parent connection object.

Once the user confirms the detach process, the system disassociates the connection with all the active crossconnects (i.e., active in the network elements and system database) pertaining to it. The system then deletes all the pending crossconnects associated with this connection and deletes the connection object from the system database.

The delete connection process 440 of FIG. 4 allows the user to delete all of the crossconnects belonging to a connection (both in the network and in the database), and also delete the connection itself from the system database. The crossconnects that are part of other connections will not be deleted. Only the association with the connection being deleted will be removed. This feature basically combines the two processes deactivate connection 438 and detach connection 436 into one process.

In the delete connection process 440, for each active crossconnect (either redline or non-redline) in the connection, the system checks to see if it is used by other connections. If it is, it removes the association for that crossconnect with the connection being deleted. If the crossconnect is not used by any other connection, the system sends the commands to delete the crossconnect in the network element. The system does not delete a higher order crossconnect in the connection. The system shows the status of each crossconnect command being sent to the network elements and dynamically updates the status according to the response from the network elements. The system then deletes all the pending crossconnects belonging to this connection, if any, from the database. When there are no more crossconnects associated with the connection object, the system deletes it from its database. The deletion of crossconnects is based on a best-effort policy. The system tries to delete the crossconnects and reports the failed deletions to the user. The system deletes the connection object from the database regardless of the result of the crossconnect deletion operation. The system confirms the deletion of the connection object or notifies user of any errors in command responses.

The network management system also includes a connection audit/reconcile process 434, as illustrated in FIG. 4. This process allows the user to reconcile a connection with network elements or reconcile network elements with a connection. The system audits all the crossconnects in the connection and shows the differences in the state of each in both the system and network element. For every crossconnect in the connection, the system retrieves the same crossconnect from the network element (s) and shows the status of it in the system database, and also in the network element on a side-by-side display. If the crossconnect does not exist in the network element, it is shown as non-existent.

The system provides a reconcile function which the user can invoke to reconcile the crossconnects in the database with those in the network element. If the user selects to reconcile the database, for all the crossconnects that differ, the system updates the crossconnect's status in the system with that of the network elements. If a crossconnect does not exist in the network element and is active in the database, the system changes the status of a crossconnect to pending. If a crossconnect is active in the network element and pending in database, the system changes the state to active in the database and updates the attributes with those of the network element crossconnect. When the system completes this process for all the differing crossconnects, it notifies the user that the database has been reconciled with the network element.

If the user selects to reconcile the network element, for all the crossconnects that differ, the system does the following: if the crossconnect is active in the database and non-existing in network element, the system sends appropriate commands to the network element to activate that crossconnect. If the crossconnect is pending in the database and active in network element, the system sends appropriate commands to delete that crossconnect from the network element. The system does not delete a crossconnect, that is not created by itself. Also, as with the deactivate and delete connection features, a higher order crossconnect like that of an STS 1 rate will not be deleted from the network element.

As shown in FIG. 4, process 405 includes a sub-process 428 that allows a user to discover a connection. For this process, given an endpoint of a connection that is not in the system database, the discover connection operation will auto-discover the connection and place routing information into the system database. This process can be used to discover the connections that existed prior to installation of the connection manager is installed. In the case of corrupted data within the database, the user can invoke the detach connection process 436, then execute the discover connection process 428 to rediscover the routing information about the connection based on network element configuration data.

For the discover connection process 428, the user specifies the AID of the source CTP, and the system retrieves the crossconnects from the incoming CTP and a list of outgoing CTPs. If there is no crossconnect found, and the current network element is the source network element, the process ends as no connection is discovered. If the current network element is not the source network element, the connection is terminated at the CTP on the previous node. The previous CTP will be the destination CTP, and the process proceeds. If there are unvisited outgoing CTPs in previous node, the system goes back to the previous nodes and proceeds. In the next step, the system gets one CTP from the outgoing CTPs, and finds its PTP. The system follows the link from the PTP to reach the next network element. If there is no link from its PTP, the connection is terminated at the CTP, i.e., the destination CTP.

If there is a link, the system gets the next network element and retrieves the incoming CTP, which uses the same timeslot as the previous CTP. For example, if the rate of the connection is VT1.5, the system will first try to get the CTP at VT1.5 rate; if there is no VT CTP, then the system will try to get STS1 CTP. The system repeats from the step of retrieving the crossconnects from the incoming CTP. For all the destination CTPs found, the system repeats to discover backward connection until it reaches the source CTP. The process ends when it reaches destination CTP, then comes back from destination CTP to the source CTP, or the system cannot go any further because of the incomplete connection.

The network management system further includes a process for validating a connection 422, as shown in FIG. 4. This process allows the validation for crossconnects, physical links and CTP timeslots. The validation process begins with the system verifying that all crossconnects originating from an incoming CTP, or from a source CTP if the current network element is the source network element. If not, the system informs the user of an error and continues with crossconnects that originate from the incoming CTP. If the connection is two-way, the system also verifies that there are two crossconnects between incoming and outgoing CTP's, otherwise the system reports an error. The system gets one CTP from the outgoing CTPs and finds its PTP. The system follows the link from the PTP to reach the next network element. If there is no link from its PTP, the process ends with the following results: if all the network elements have been visited, connection validation is successful and the connection is terminated at the CTP. If there are still unvisited network elements, system informs user of the error. If the user specifies the destination CTP, the system also check if the current CTP is the destination CTP and informs the user if they are not the same. The system gets to the next network element and retrieves the incoming CTP, which uses the same timeslot as the previous CTP. For example, if the rate of the connection is VT1.5, the system will first try to get the CTP at VT1.5 rate; if there is no VT CTP, then the system will try to get STS1 CTP. The process then repeats, and ends when it end of the connection is reached or the system cannot go any further because of the incomplete connection. The system then informs the user whether the connection is valid or not and the reasons.

In one embodiment of the present invention, the network management system includes a node management process that allows the user to insert and remove network elements from network as well as reconfigure the network architecture. These operations are collectively referred to as node management. These operations can affect the network element configuration, network topology, and connection database. The node management process automates as much of the provisioning work as possible to relieve the user from the bulk of provisioning activities.

For node management, the network topology must be defined and the network elements in the topology must be autodiscovered. The new network element to be inserted is then created and autodiscovered. To execute this process, the user selects a link on the topology map and selects insert node menu. The system asks the TID of the new node and the AIDs of the PTPs the new links will connect to. The system finds all the connections that will be affected and displays them to the user. The system asks the user to confirm the insertion. If the user cancels it, the process ends without any change to the system. If the user confirms, the system deletes the link the user selected and creates two new links from the new node to the nodes originally connected to deleted link. The system adds the new node and crossconnects to the affected connections. The system creates the crossconnects on the new node. The state of crossconnects will be set according to the following rule: if the state of a connection is active, the crossconnect will be created as active; if the state of a connection is pending, the crossconnect will be created as pending; and if the state of a connection is partial, the crossconnect will be created as pending. This process ends when the user confirms the cross connection creation or the user cancels the cross connection creation.

When a node is removed from the system, the system finds the affected connections and displays them to the user. The system asks the user to confirm the deletion. If the user cancels it, the process ends without any change to the system. If the user confirms the removal, the system deletes the links connected to node and creates new links between the nodes which are originally connected to the removed node. The system removes the crossconnects of the node from connections. The system deletes the crossconnects from the network element. The links connected to the removed node are deleted and necessary new links are created. The crossconnects on the removed node are removed from the connections and network element.

Figure 12:
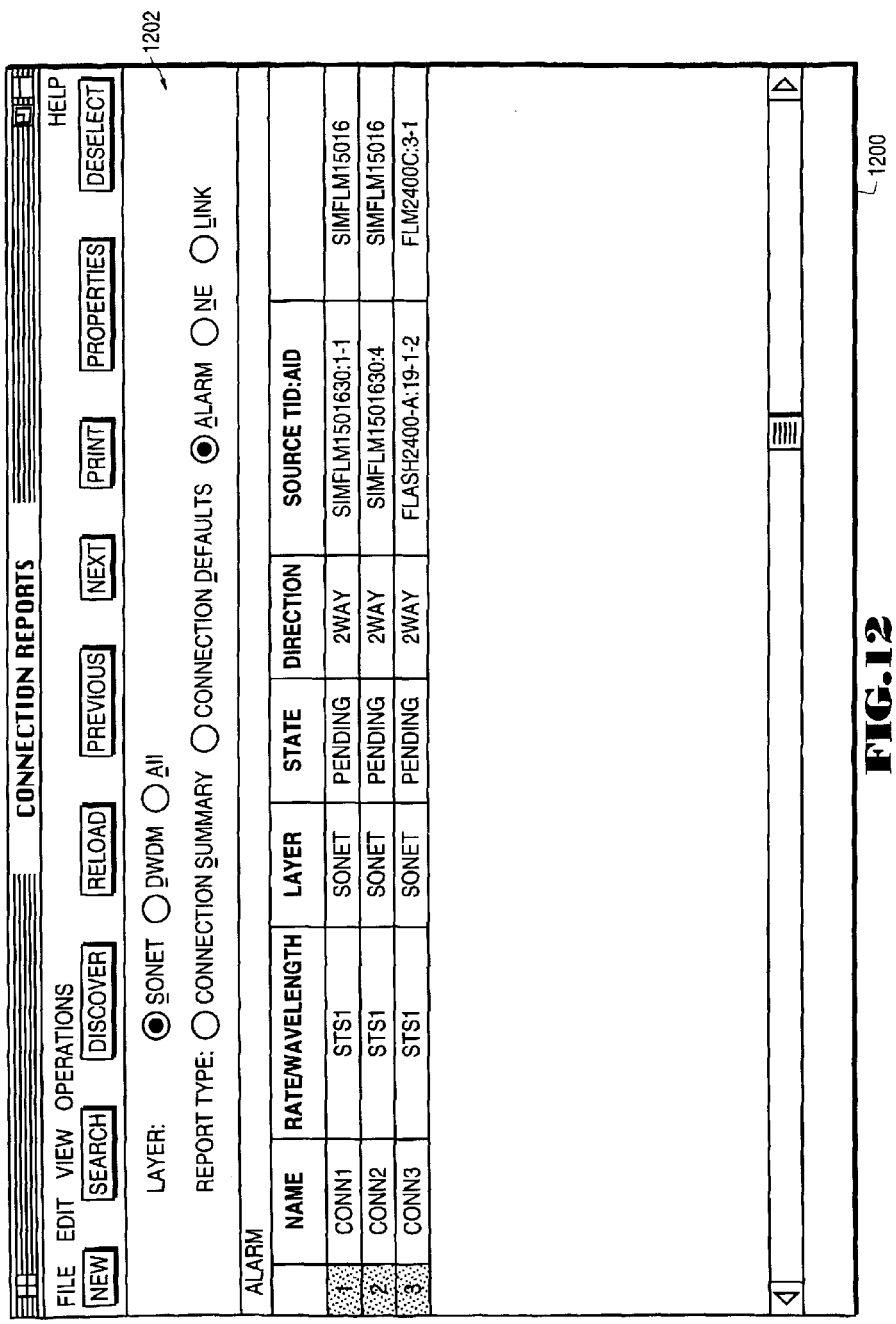
FIG. 12 illustrates the connection report display screen for a graphical user interface utilized by the network management system program, according to one embodiment of the present invention.

In one embodiment of the present invention, the network management system program includes a graphical user interface that displays various windows relating to the connection management system. The main window of the connection management system is the connection summary report window. FIG. 12 illustrates the connection summary report display screen for a graphical user interface utilized by the network management system program, according to one embodiment of the present invention. The connection summary report window displays summary information for all or selected connections in the network, and provides access through an options field 1202 to other reports for various layers within the network. The main display area of connection summary report window 1200 includes various display fields, such as, the name of the connection, rate/wavelength, layer, state, direction, source network element TID, source CTP AID, destination network element TID, destination CTP AID, and other possible similar connection parameters.

As illustrated in FIG. 12, the connection summary report window provides access to other report windows, including a connection details window, alarm window, network element window, and a link report window. The connection details report window provides detail data of all connections within the network. The alarm report window provides information regarding all connections that have alarms. The network element report window displays all connections and the network elements that they contain. The link report window contains information regarding all connections that pass through links.

Figure 13:
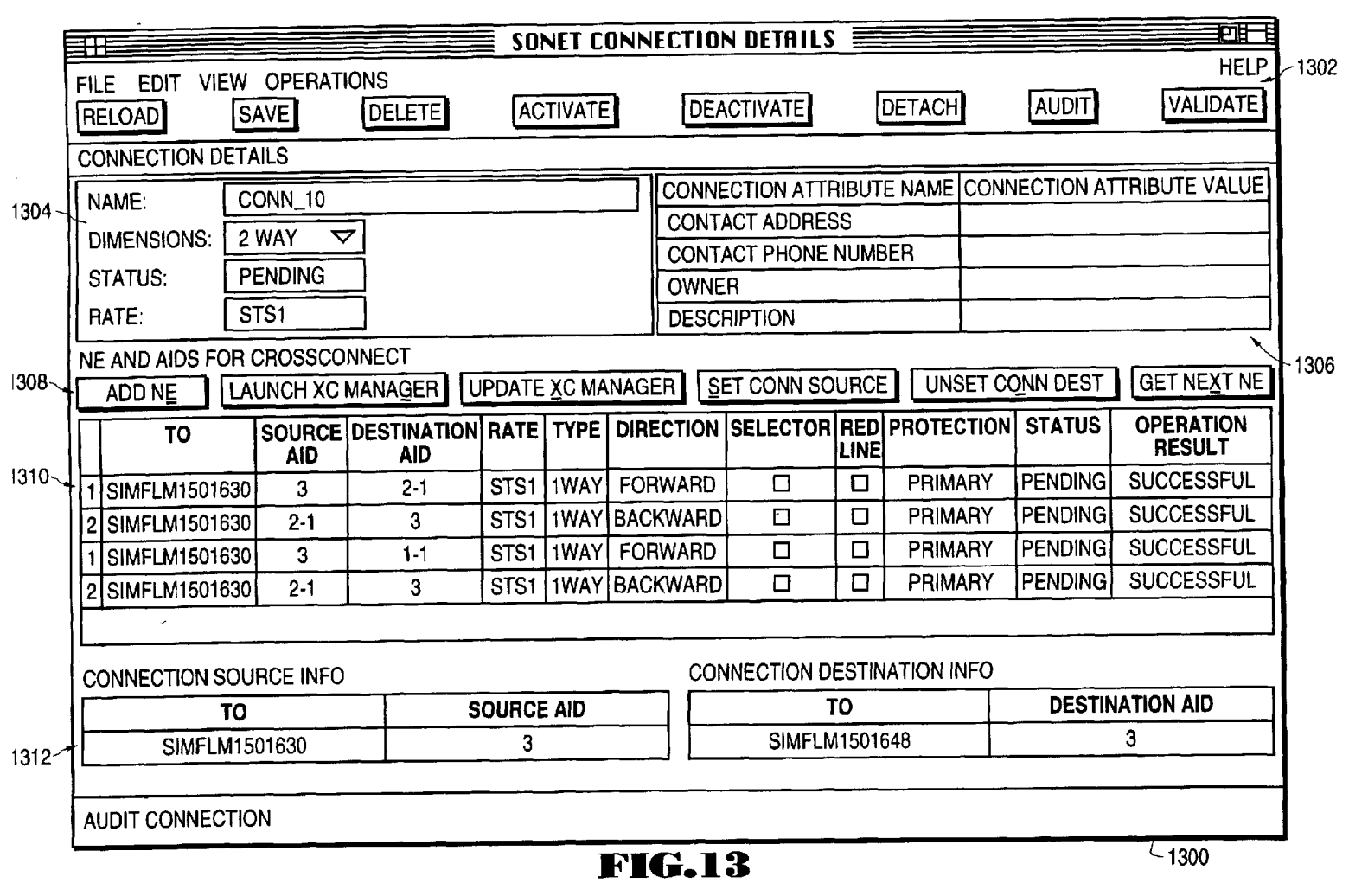

Individual connections are created and maintained using the connections details window, which is launched from the connections report window. FIG. 13 illustrates the connection details report display screen, according to one embodiment of the present invention. The connection details report shows the details of selected connections in the network. The main display window 1300 contains all of the fields of the summary report 1200, in addition to fields 1304 for crossconnect information, such as rate, type, and status. The remaining display areas 1306, 1308, 1310, and 1312 generally correspond to fields 506–512 described in relation to FIG. 5.

Figure 14:
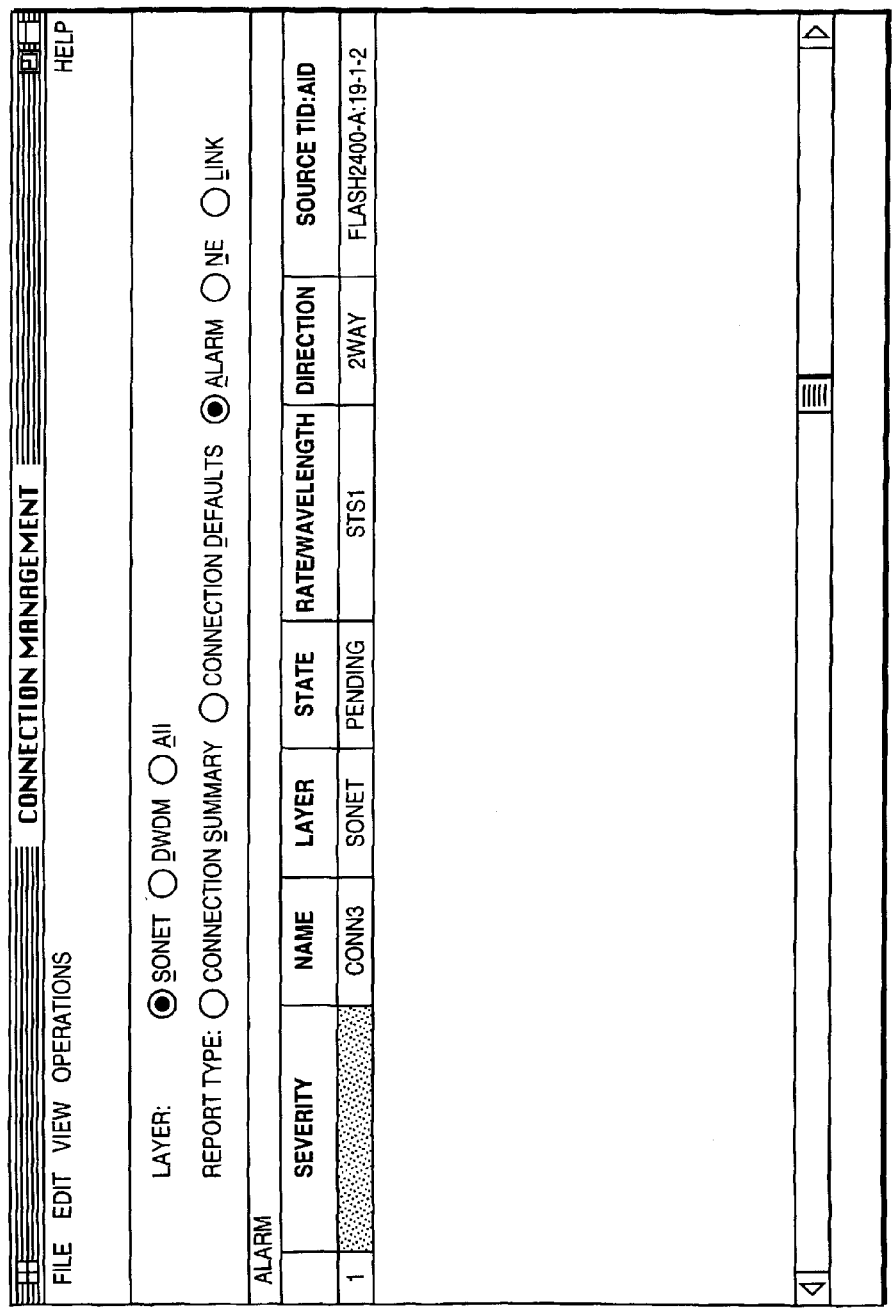
FIG. 14 illustrates the alarm report display screen, according to one embodiment of the present invention.

A connection management alarm report is accessible through the connection summary report window 1200. The alarm report window displays a summary report about all alarms related to a connection. FIG. 14 illustrates the alarm report display screen, according to one embodiment of the present invention. The main display area 1400 of the alarm report display screen provides several display fields including a severity field that indicates the severity of the alarm, such as critical, major, minor, and warning. The name, layer, state, and direction of the wavelength are also displayed. Other fields include the rate/wavelength of the connection, the network element TID/AID for the source in the connection, the network element TID/AID for the destination in the connection, the connection attributes, and the fault or alarm type.

In one embodiment of the present invention, the graphical user interface of the network management system includes various dialog screens that enable the user to perform and view the results of various functions. These dialog screens are typically implemented as sub-windows or overlay windows that are displayed in conjunction with a main display screen, such as the connection report window of FIG. 12. One such dialog function is a search dialog that allows the user to search for a connection based on certain connection criteria, such as, connection name, network element, AID, direction, rate, connection attributes (name/value pair), and other such criteria. The search results are displayed in a results table, and the connection can be selected and displayed in the main details screen.

A discovery dialog allows the user to discover an existing connection by providing a source TID and source AID. The resulting crossconnects from the discovery are shown in a table and can be used to create a new connection.

Figure 16:
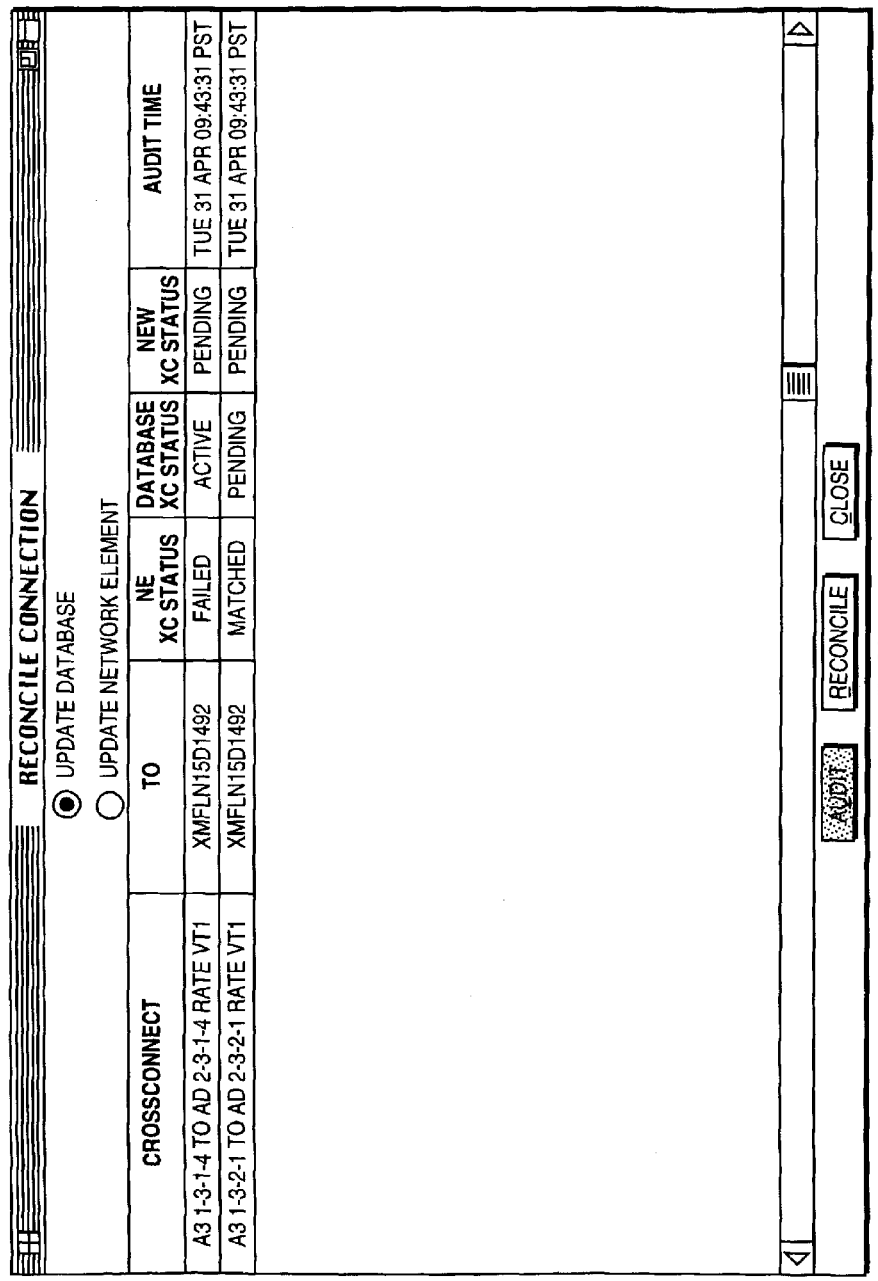
FIG. 16 illustrates an exemplary reconcile connection dialog sub-window.

An audit/reconcile dialog allows the user to find crossconnect discrepancies between the network elements in a connection and the network database. In one embodiment, the audit process is performed in batch and the reconcile process is performed in real-time. The dialog table is dynamically updated to show the current processing. FIG. 15 illustrates an exemplary audit connection dialog sub-window, and FIG. 16 illustrates an exemplary reconcile connection dialog sub-window.

It should be noted that the Figures illustrating various graphical user interface screens and dialog sub-windows illustrate exemplary embodiments, and that the layout and content of such display elements can be changed depending upon actual implementation details of the network management system.

Although embodiments of the present invention have been described with reference to SONET networks, alternative embodiments can be used with other types of networks, such as SDH, T1, and other similar wide-area or large-scale networks.

In the foregoing, a connection management system and graphical user interface for managing wide area optical networks has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A network management system for displaying connections associated with a network span coupling a first network element to a second network element, the system comprising:

a first user input area within a first display window allowing a user to specify a network address for a source network element;

a second user input area within the first display window allowing the user to specify a network address for a destination network element;

a third user input area within a second display window allowing the user to graphically select a connection between the source network element and one or more destination network elements in the network, wherein the connection is based on a timeslot of a physical link between the source and destination network element;

a first program module allowing the user to store the selected connection as a pending connection or an active connection;

a second program module establishing a physical connection between the source and destination nodes upon activation by the user;

a synchronization function correlating a display of transmission channels within the first display area with a display of reception channels in the second display area; and a scrolling function configured to simultaneously scroll the display of the reception channels in the second display area in accordance with user scrolling of the display of the transmission channels in the first display area.

2. The network management system of claim 1 further comprising a third module for allowing the user to manually provision one or more crossconnects within each network element of the source network element and one or more destination network elements.

3. The network management system of claim 1 further comprising:

a validation module that automatically validates the connection to determine whether the connection attributes conform to predefined conditions; and a storage module that stores the connection information for a validated connection in a database.

4. The network management system of claim 1 wherein the network comprises a Synchronous Digital Hierarchy network.

5. The network management system of claim 1 wherein the network comprises a Synchronous Optical Network comprising a plurality of networked nodes coupled through fiber optic links.

\* \* \* \* \*